United States Patent [19]

Jeziorski

[11] Patent Number: 4,810,175

[45] Date of Patent: Mar. 7, 1989

[54] HERMETIC MOTOR BEARING ASSEMBLY

[75] Inventor: Harry J. Jeziorski, Milwaukee, Wis.

[73] Assignee: MagneTek, Inc., Los Angeles, Calif.

[21] Appl. No.: 84,564

[22] Filed: Aug. 12, 1987

[51] Int. Cl.4 .................... F04B 39/00; F04B 39/14

[52] U.S. Cl. ........................ 417/423.12; 417/360; 415/201; 277/9.5; 384/273

[58] Field of Search .......... 417/423 G, 423 K, 423 L, 417/423 M, 423 P, 423 S, 423 T, 360, 424 A, 424 R; 415/201, 170 A, 170 R; 277/9, 9.5, 137; 384/273, 294, 906; 310/90

[56] References Cited

U.S. PATENT DOCUMENTS

| | | | |
|---|---|---|---|
| 2,161,559 | 7/1937 | Cooke | 384/273 |
| 2,172,135 | 9/1939 | Brever | 417/423 P |
| 2,693,760 | 11/1954 | Miller | 415/201 |
| 2,945,709 | 7/1960 | Freed et al. | 277/9 X |
| 3,405,948 | 10/1968 | Junker | 277/137 |
| 4,018,544 | 4/1977 | Eberhardt | 277/137 |
| 4,022,423 | 5/1977 | O'Connor et al. | 415/126 X |
| 4,073,550 | 2/1978 | Yahraus | 384/294 X |
| 4,289,317 | 9/1981 | Kuc | 277/9 X |
| 4,540,294 | 9/1985 | Lamperski et al. | 384/273 |
| 4,575,098 | 3/1986 | Escue | 277/9 |
| 4,661,044 | 4/1987 | Freeland | 415/201 |

OTHER PUBLICATIONS

Mixflo Pumps, 8/1962, Worthington Corporation.

Primary Examiner—Leonard E. Smith
Assistant Examiner—Eugene L. Szczecina, Jr.
Attorney, Agent, or Firm—Faegre & Benson

[57] ABSTRACT

An improved bearing assembly for use with motors having shaft extensions connected to associated machinery is disclosed wherein the shaft extension bearing may be accessed and replaced from inside the motor without removal of the associated machinery from the shaft extension.

24 Claims, 6 Drawing Sheets

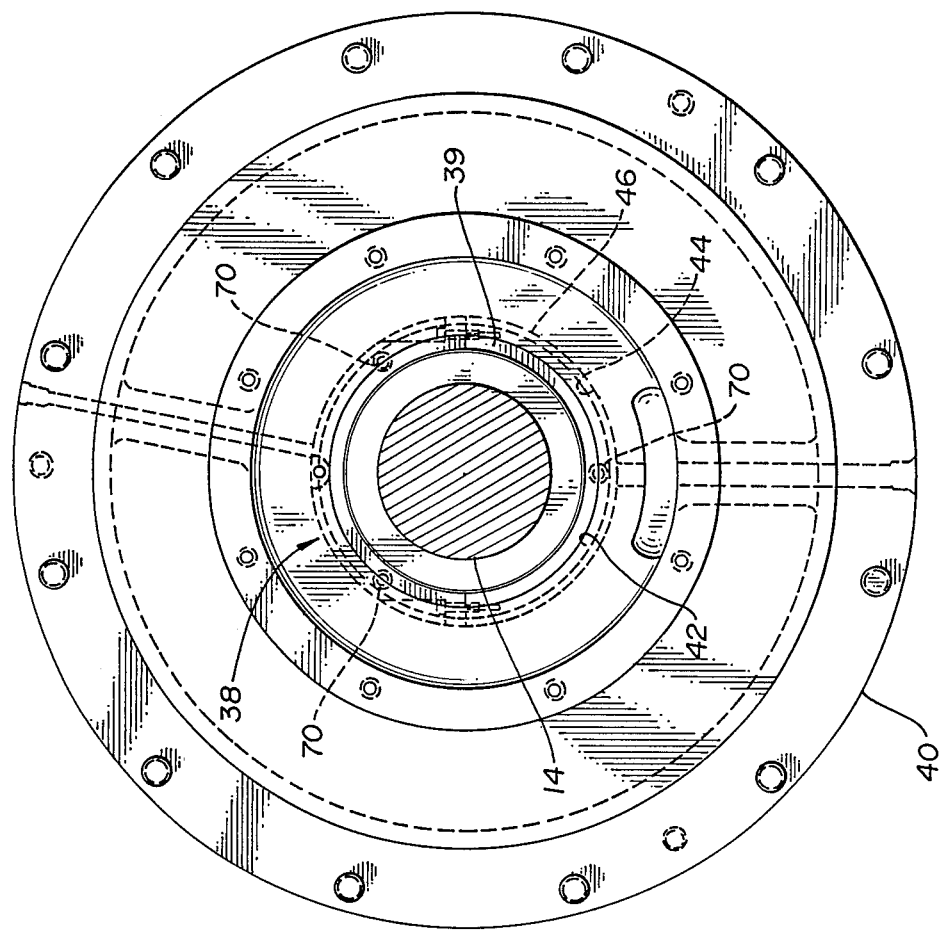
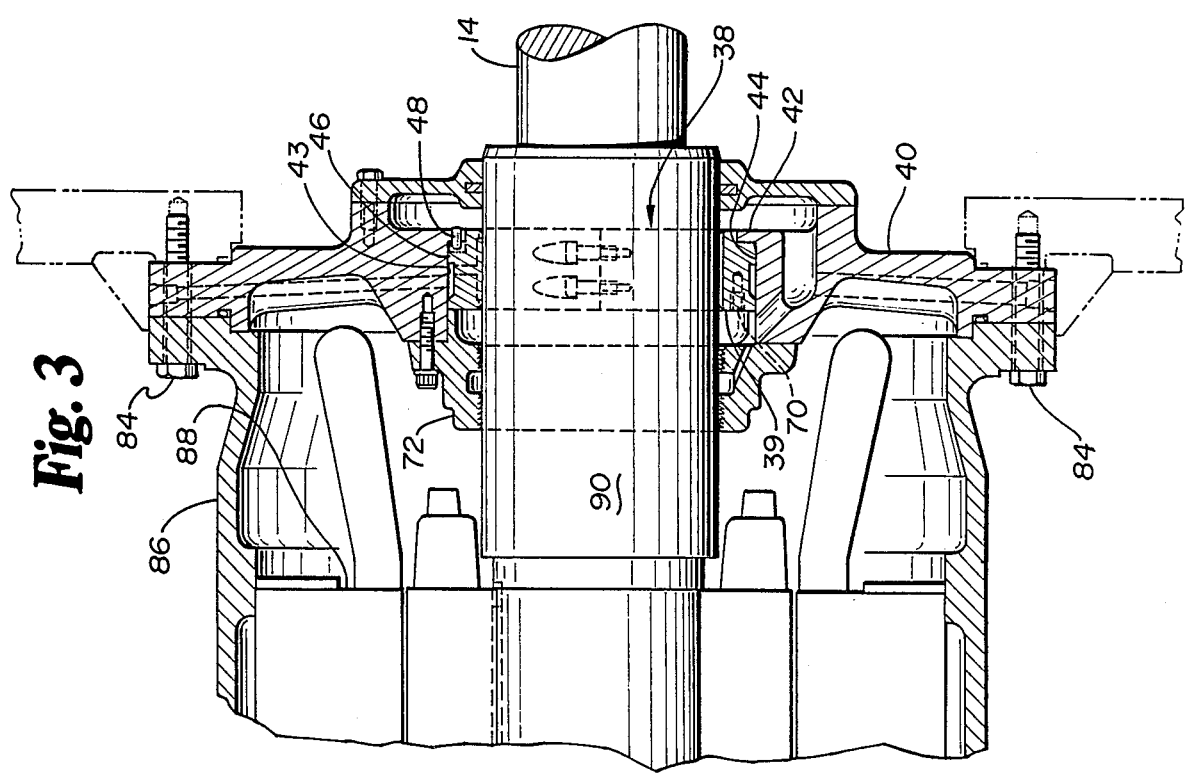

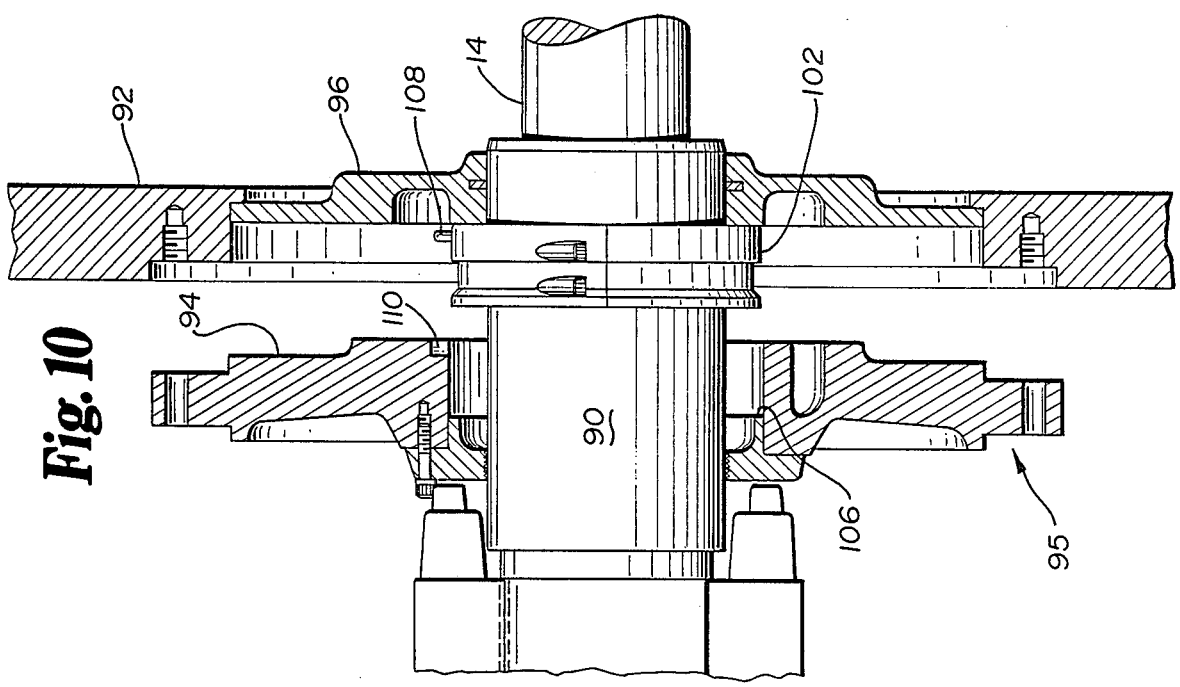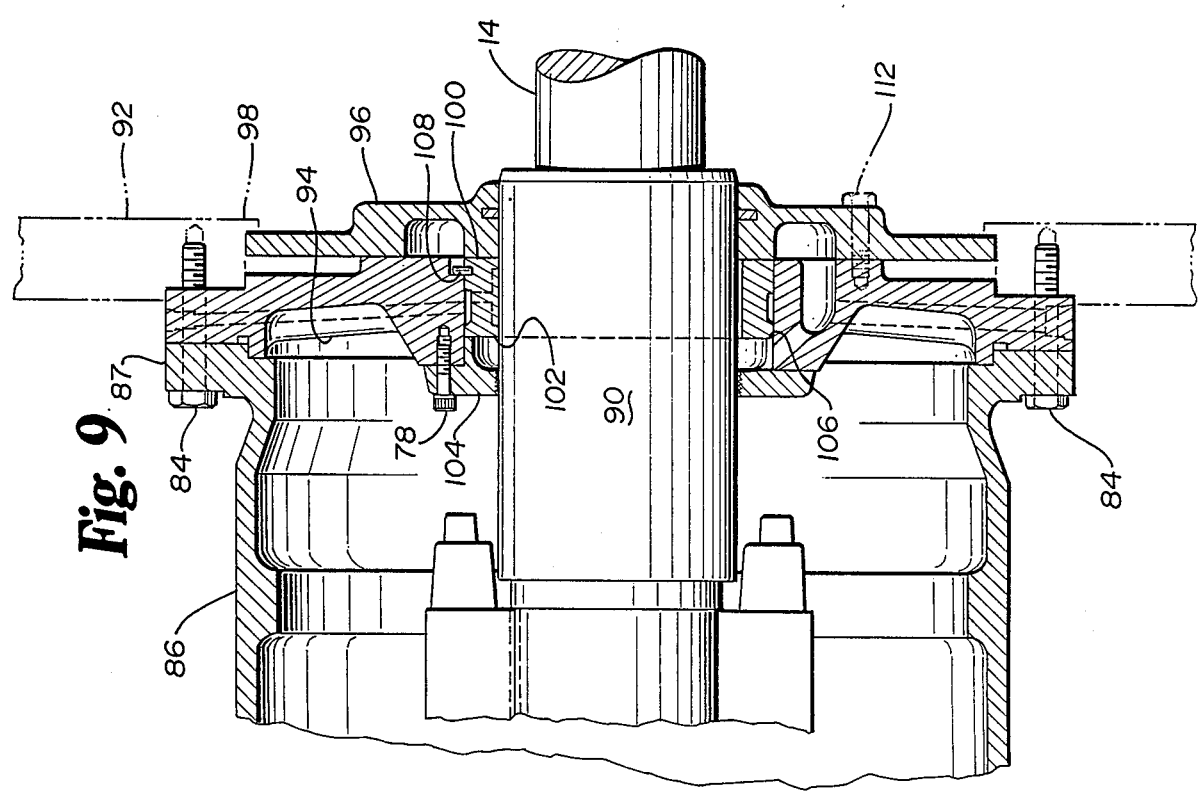

HERMETIC MOTOR BEARING ASSEMBLY

BACKGROUND OF THE INVENTION

In the past, motors having shaft extensions connected to associated machinery, for example, centrifugal compressors, required the disassembly of the compressor or other connected machinery and removal of parts secured to the shaft extension in order to remove the motor housing and replace the motor bearing supporting the shaft extension. Such a construction resulted in a costly and time consuming process for servicing either the motor stator or the shaft extension bearing.

BRIEF DESCRIPTION OF THE DRAWINGS

FIG. 3 shows a partial section view of a bearing assembly of the present invention.

FIG. 4 shows an end view of the bearing bracket and bearing of the present invention.

FIG. 9 shows a simplified view of an alternative embodiment of the present invention.

FIG. 10 shows a simplified view of the embodiment of FIG. 9 in a state of partial disassembly with the motor housing and stator removed.

DETAILED DESCRIPTION OF THE PREFERRED EMBODIMENT

Figure 1:
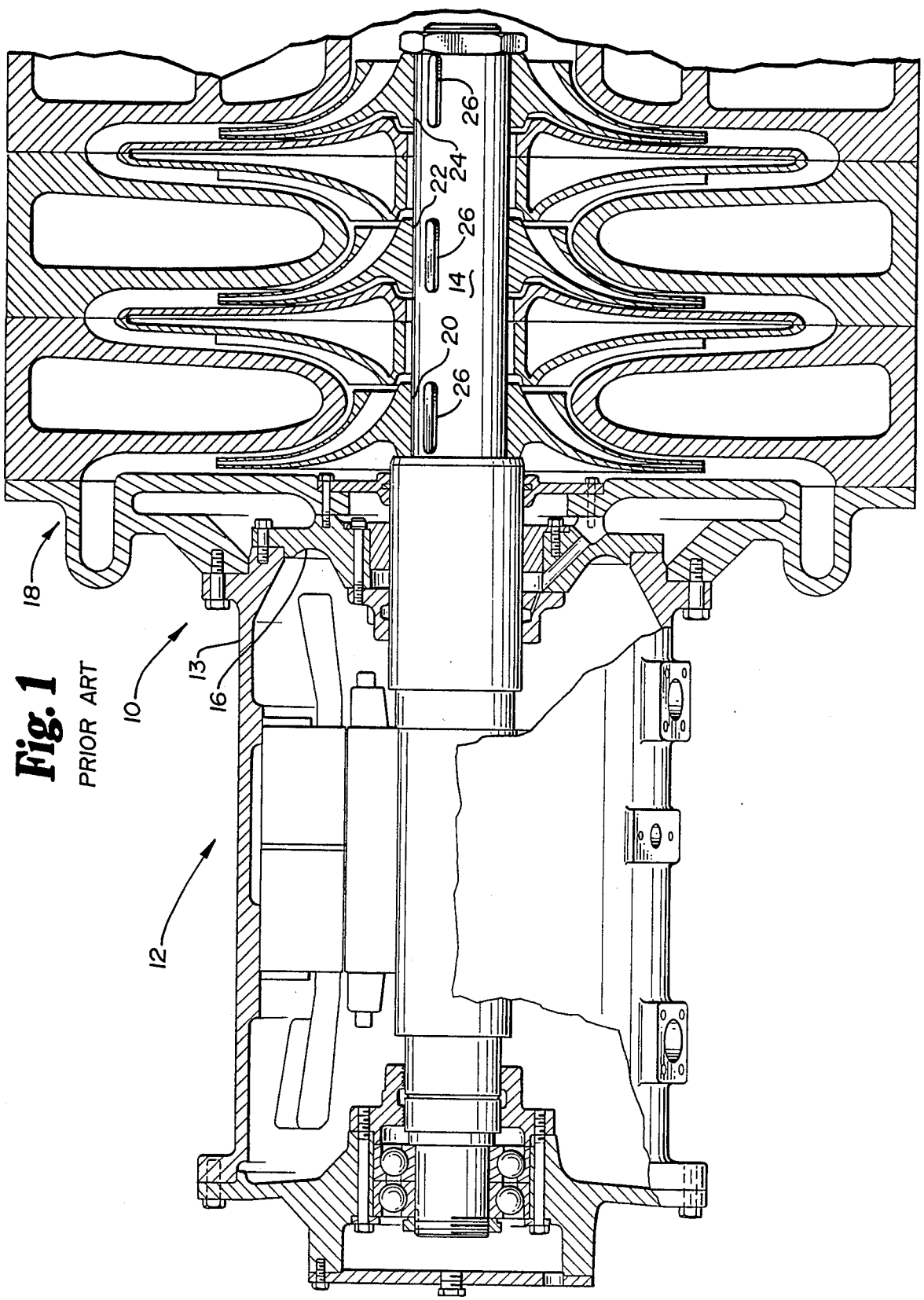
FIG. 1 is a partial cross sectional view of a hermetic motor with a shaft extension and a simplified view of a centrifugal compressor connected to the shaft extension.

Referring to FIG. 1, a prior art motor and compressor assembly 10 may be seen. Assembly 10 has a motor 12 in a housing 13 and has a shaft extension 14 projecting through a bore 15 in a bearing bracket 16 intermediate the motor 12 and a compressor 18. Compressor 18 (shown in greatly simplified form) has a plurality of impellers 20, 22, 24 secured to shaft extension 14 by means of keys (not shown) in keyways 26. As may be seen, in order to obtain access to the stator or shaft extension bearing of the prior art motor 12, compressor 18 was required to be disassembled from shaft extension 14. This was so, even if it was only desired to remove motor housing 13, for example, to inspect the motor stator.

Figure 2:
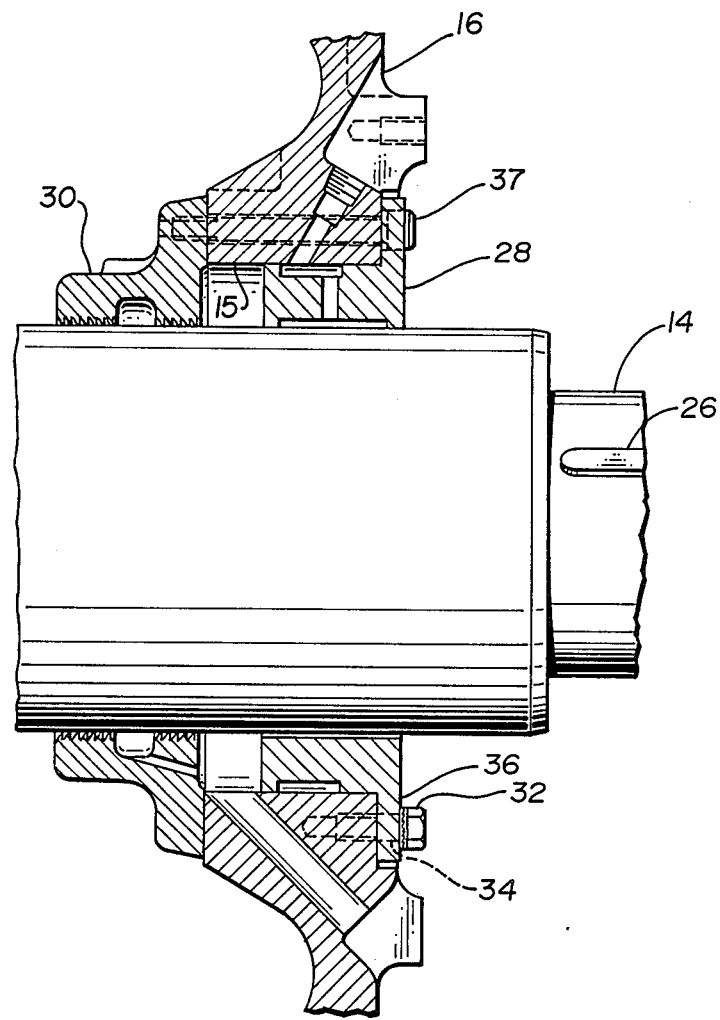
FIG. 2 is an enlarged detail view of a prior art bearing assembly at the shaft extension end of the motor of FIG. 1.

Referring now more particularly to FIG. 2, details of a prior art shaft extension bearing 28 and seal 30 may be seen. A plurality of bolts or machine screws 32 secure bearing 28 to bearing bracket 16 by means of apertures 34 in a radially outwardly projecting flange 36 of bearing 28.

A plurality of socket head screws 37 retain seal 30 to bearing bracket 16.

In the prior art, it was necessary to disassemble the associated machinery 18 located on shaft extension 14 in order to remove housing 13 to gain access and remove bearing 28. In addition to being costly and time consuming, disassembly of associated machinery exposed it to contamination and damage, all of which is avoided by the present invention.

Referring now to FIGS. 3-6, in a first embodiment of the present invention an improved bearing assembly 38 is located in an intermediate bearing bracket 40. Bracket 40 has a reduced diameter portion formed by inwardly projecting lip or flange 42. Flange 42 is disposed to the exterior of the supporting region 43 of bore 44.

Bearing bracket 40 has a bore 44 closely interfitting with the outer diameter 46 of bearing 38. Bearing bracket 40 further has an axially oriented projection or pin 48 received in a mating axial aperture 50 in bearing 38. Alternatively, projection 48 and aperture 50 may be interchanged. Projection 48 and aperture 50 cooperate to prevent relative rotation between a ring member 39 and bearing bracket 40.

Figure 6:
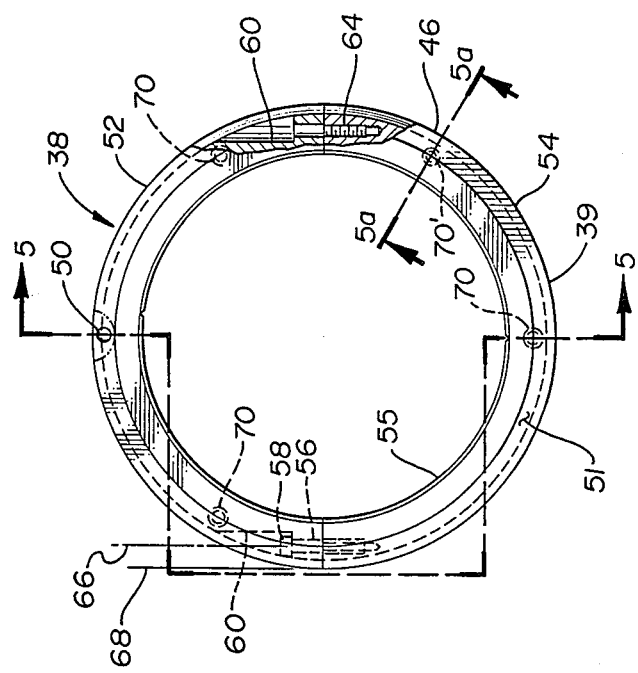
FIG. 6 shows an end view of the bearing useful in the assembly of the present invention.
Figure 5:
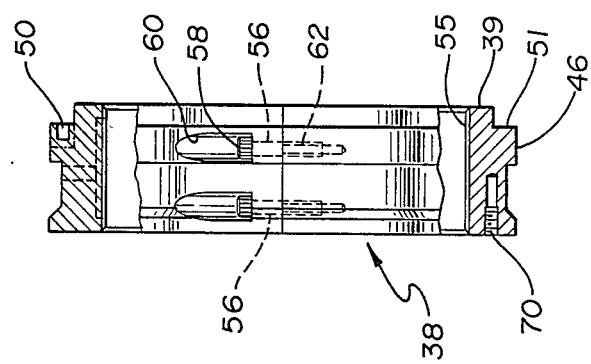
FIG. 5 shows a side view of the bearing useful in the assembly of the present invention.

Referring more particularly to FIGS. 5 and 6, member 39 has an axial face 51 for abutting flange 42 preferably has at least two arcuate parts or segments 52, 54 separable from each other and from the motor shaft 14. Parts 52, 54 form annular member 39 when joined together by suitable fastening means such as threaded fasteners or cap screws 56. Ring member 39 has an inner diameter 55 for supporting a motor shaft portion 90 which passes through bearing bracket 40. Screws 56 each preferably have a head 58 retained by a counterbore 60 in part 52. Screws 56 each further preferably have a threaded portion 62 received in a threaded aperture 64 in part 54. Apertures 64 are along an axis 66 parallel to a tangent 68 of the outer diameter 46 of ring 39. Ring 39 further has a plurality of axially oriented threaded apertures 70 disposed equidistantly from each other around the circumference of ring 39. Apertures 70 are useful in moving ring 39 out of bore 44 in bearing bracket 40. It is to be noted that ring member 39 has no radial projection larger than bore 44 exterior of bracket 40.

Figure 5A:
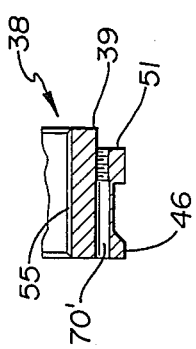
FIG. 5a shows a detail view of an alternative embodiment of the bearing of FIG. 5.

Referring now to FIGS. 5a and 6, instead of lined aperture 70, a through aperture 70' may be provided to move ring member 39 axially. Apertures 70' are preferably at least partially threaded, preferably in the region of face 51. To move ring 39 axially utilizing apertures 70', threaded bolts are placed in apertures 70'. The bolts received in apertures 70' will drive against lip or flange 42, moving ring 39 axially away from shaft extension 14. It is to be understood that there are preferably three equidistantly placed apertures 70' when this approach is used. Alternatively, apertures 70 may be located at the position indicated for apertures 70' if found more convenient.

Figure 8:
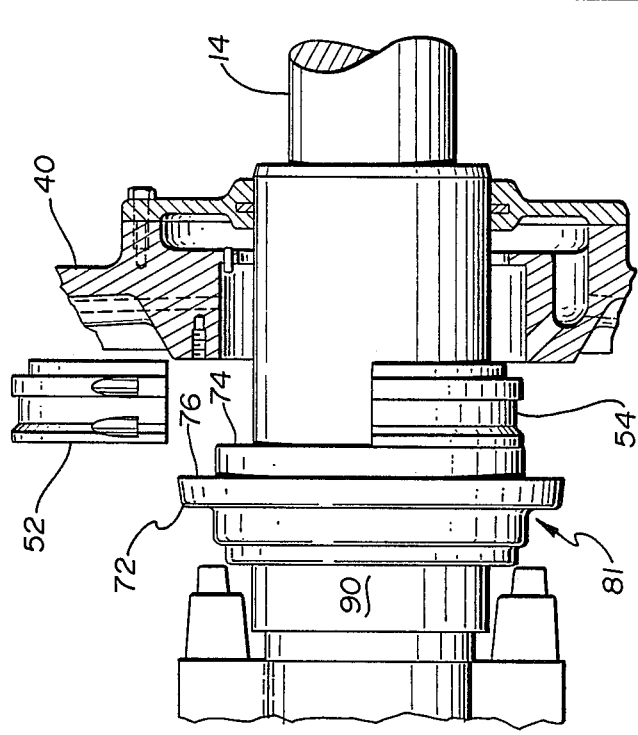
FIG. 8 shows the present invention in a further state of disassembly with the seal and bearing moved axially with respect to the bearing bracket and one part of the bearing moved radially with respect to the motor shaft.
Figure 7:
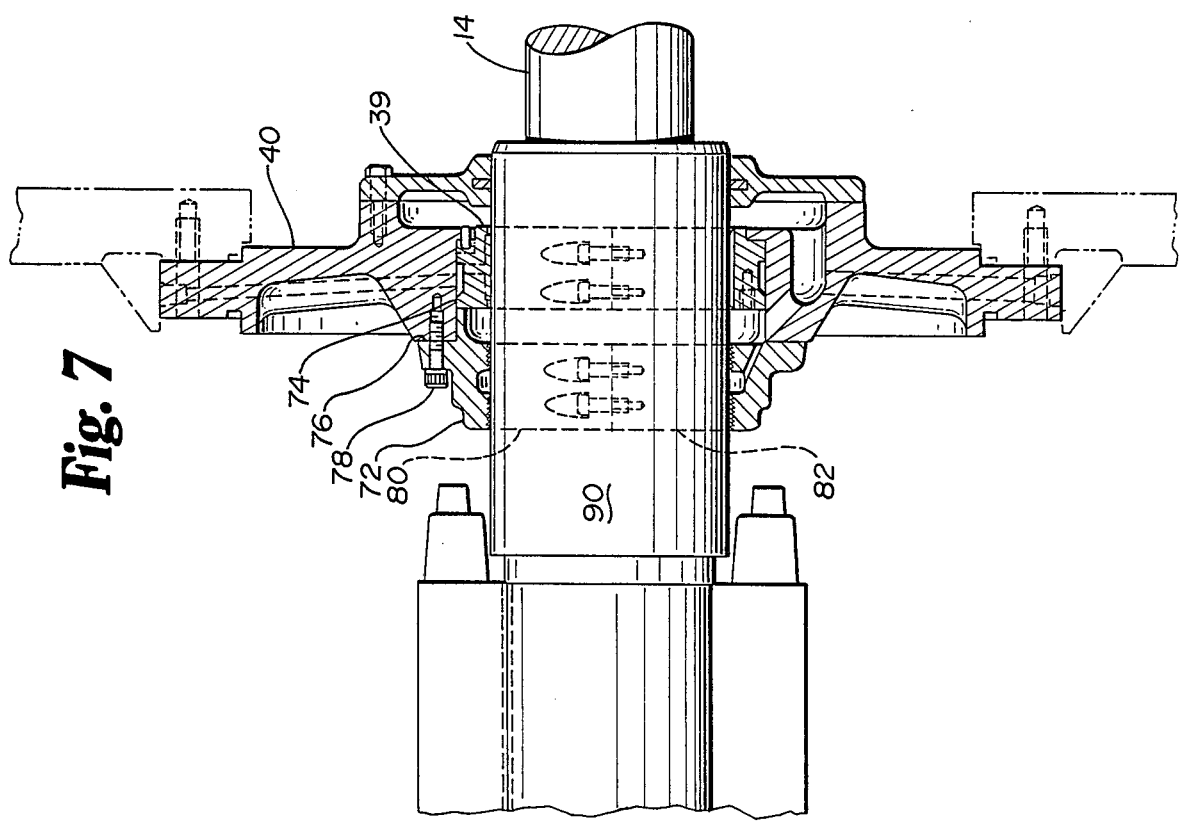
FIG. 7 is a partial section view of the structure of FIG. 3 in a state of partial disassembly with the motor housing and stator removed, and showing an alternative embodiment for the bearing seal of the present invention.

Referring now more particularly to FIGS. 7 and 8, an annular bearing cap or seal 72 has a first axial face portion 74 abutting ring member 39 and a second axial face portion 76 abutting bearing bracket 40. Cap 72 is preferably secured to bearing bracket 40 by axially aligned fastening means such as machine screws or bolts 78 which secure seal 72 to the interior of bearing bracket 40. Seal 72 may be a single piece 81, as shown in FIG.

8, or may be separable into two or more arcuate segments 80, 82 as shown in FIG. 7.

Referring now to FIGS. 3, 7 and 8, to service bearing assembly 38, bolts 84 are removed, freeing motor housing 86. Motor housing 86 is then removed, carrying with it stator 88. The structure is now as shown in FIG. 7. Bolts 78 are removed, releasing bearing seal 72 which is located interior of bearing ring member 39. Seal 72 is moved axially along motor shaft portion 90 in a direction away from shaft extension 14. If there is sufficient room on shaft portion 90, cap or seal 72 may be left on the shaft as shown in FIG. 8. If there is insufficient clearance to remove ring member 39 adjacent cap 72 when both are displaced axially from bearing bracket 40, bearing cap 72 may be a split design as shown in FIG. 7. In such case, cap or seal 72 is displaced axially and then disassembled and removed from shaft portion 90 to permit access to and removal of ring member 39.

Ring member 39 is axially moveable away from shaft extension 40 by a suitable conventional mechanism similar to a bearing puller, attached to ring 39 at apertures 70. Once ring member 39 is moved to a position having radial clearance with bearing bracket 40 as shown in FIG. 8, fasteners 56 are removed and parts 52 and 54 of ring member 39 are separated and radially removed.

To reassemble bearing assembly 38, parts 52, 54 are radially inserted and joined into a bearing ring member 39 encircling motor shaft portion 90. Ring member 39 is then axially moved toward the shaft extension 14 until member 39 is seated in the intermediate bearing bracket 40 such that projection 48 is received in aperture 50. Bearing seal 72 is then axially moved toward the shaft extension 14 and secured to bearing bracket 40 by bolts 78.

Referring now more particularly to FIGS. 9 and 10, an alternative embodiment of the present invention may be seen. As in the previous embodiment, motor housing 86 is secured to a housing 92 of associated machinery 18 (such as a centrifugal compressor) by bolts 84 which pass through a circumferential flange 87 and a bearing bracket 94. An outer seal 96 is located on shaft portion 90 by lip or flange 98 on housing 92. Seal 96 further has a face 100 for limiting axial movement of bearing 102 towards shaft extension 14. An inner seal 104 is secured to bearing bracket 94 preferably by machine screws 78. Seal 104 further preferably has a shoulder 106 which locates bearing 102 axially within bracket 94. To prevent rotation of bearing 102 in bracket 94, a radially oriented pin 108 is preferably located in bearing 102. Pin 108 is received in a mating recess 110 in bracket 94. Alternatively the arrangement of pin 48 and aperture 50 of FIGS. 3 and 6 may be used. Bracket 94 preferably has a diametral extension 95 of sufficient diameter such that the perimeter of bracket 94 is retained between flange 87 and compressor or other associated machinery housing 92.

To access and service bearing 102 in this embodiment, housing 86 is removed and bracket 94 is moved axially along portion 90 away from shaft extension 14. Bearing 102 may then be removed and replaced in a manner similar to that shown in FIG. 8.

If it is desired to protect bearing 100 in a replacement motor during shipment, machine screw 112 may be installed to hold seal 96 to bracket 94, but would be preferably removed prior to installation of the motor. Bolts 84 would also preferably be installed with nuts in place of housing 92 during shipment.

The invention is not to be taken as limited to all of the details thereof as modifications and variations thereof may be made without departing from the spirit or scope of the invention.

What is claimed is:

1. A motor shaft extension bearing assembly for a motor of the type having a motor shaft portion passing through a bearing bracket and a unitary motor shaft extension projecting exteriorly of the bearing bracket for driving associated machinery wherein the shaft extension bearing assembly is supported in a bore in the bearing bracket intermediate the motor housing and associated machinery housing, the motor shaft extension bearing comprising an annular ring member having:
   (i) an outer diameter for closely interfitting and being supported by the bearing bracket bore;
   (ii) an inner diameter for supporting the motor shaft portion passing through the bearing bracket; and
   (iii) a projection extending from one of the annular ring member and the bearing bracket, and
   (iv) a recess in the other of the annular ring member and the bearing bracket for matingly receiving the projection to prevent relative rotation between the ring member and the bearing bracket when the ring member is received in the bearing bracket such that the bearing and bearing bracket are movable axially with respect to one another without separating the associated machinery from the motor shaft extension.

2. The bearing assembly of claim 1 wherein the ring member further comprises at least two parts separable from each other and from the motor shaft.

3. The bearing assembly of claim 2 further comprising fastening means for securing the two parts together around the motor shaft.

4. The bearing assembly of claim 3 wherein the fastening means further comprises a plurality of threaded fasteners.

5. The bearing assembly of claim 4 wherein the threaded fasteners comprise cap screws.

6. The bearing assembly of claim 5 wherein the mating threaded apertures are parallel to a tangent of the outer diameter of the ring member.

7. The bearing assembly of claim 1 wherein the ring member further comprises a plurality of axially oriented threaded apertures disposed equidistantly from each other around the circumference of the ring member and adapted for moving the ring member axially along the shaft.

8. The bearing assembly of claim 1 wherein the bearing bracket has a reduced diameter portion exterior of the supporting bore for limiting axial movement of the ring member in the direction of the shaft extension and the ring member further comprises an axial face for abutting the reduced diameter of the bearing bracket.

9. The bearing assembly of claim 8 wherein the projection is an axial projection in one of the reduced diameter portion and the axial face and the recess is an axial aperture in the other of the reduced diameter and axial face for receiving the axial projection for preventing relative rotation between the ring member and the bearing bracket when the ring member is received in the bearing bracket.

10. The bearing assembly of claim 1 wherein the bearing bracket is axially movable away from the associated machinery and wherein the bearing bracket and motor shaft extension bearing are axially movable with respect to each other to provide radial access to the motor shaft extension bearing without separating the associated machinery from the motor shaft extension.

11. The bearing assembly of claim 1 further comprising an axially displaceable seal around the motor shaft and interior of the ring member and having a first axial face portion abutting the ring member and a second axial face portion abutting the bearing bracket.

12. The bearing assembly of claim 11 wherein the seal further comprises axially aligned fastening means for securing the seal to the bearing bracket.

13. A method of servicing a bearing assembly in a motor of the type having a unitary shaft extension projecting exteriorly of the motor and directly mounted on associated machinery adjacent a bearing bracket intermediate the motor housing and associated machinery housing without requiring dismounting of the associated machinery from the shaft extension, the method comprising:
 (a) releasing a bearing seal interior of the bearing for axial movement of the seal on the shaft;
 (b) axially moving the bearing seal away from the shaft extension;
 (c) axially moving the bearing ring member away from the shaft extension to a position having radial clearance with the intermediate bearing bracket;
 (d) separating the ring member into at least two parts; and
 (e) radially removing the bearing ring member parts.

14. The method of claim 13 further comprising:
 (f) radially inserting and joining mating parts into a bearing ring member encircling the motor shaft;
 (g) axially moving the bearing ring member toward the shaft extension until the bearing ring member is seated in the intermediate bearing bracket; and
 (h) axially moving the bearing seal toward the shaft extension and securing the bearing seal to the intermediate bearing bracket.

15. A method of servicing a bearing assembly in a motor of the type having a housing and a unitary shaft extension projecting exteriorly of the motor and directly assembled to associated machinery adjacent a bearing bracket intermediate the motor housing and associated machinery without requiring disassembly of the associated machinery housing from the shaft extension, the method comprising:
 (a) removing the motor housing;
 (b) axially moving the intermediate bearing bracket away from the shaft extension to a position having radial clearance with the bearing;
 (c) separating the bearing into at least two parts; and
 (d) radially removing the bearing parts.

16. The method of claim 15 further comprising:
 (e) radially inserting and joining mating parts into a bearing encircling the motor shaft;
 (f) axially moving the bearing bracket toward the shaft extension to position the bearing axially on a portion of the shaft adjoining the shaft extension.

17. In a motor of the type having a shaft extension adapted for direct connection to associated rotating equipment without an intervening shaft coupling and further having a bearing bracket intermediate the motor and associated equipment, a bearing assembly in combination therewith comprising:
 (a) a segmented annular bearing means formed of at least two arcuate segments for supporting the shaft in the bearing bracket wherein one of the bearing means and the bearing bracket has a projection and the other of the bearing means and the bearing bracket has a mating recess for preventing rotation of the bearing means in the bearing bracket;
 (b) a radially inwardly projecting lip on the bearing bracket for preventing movement of bearing means to the exterior of the motor along the shaft; and
 (c) annular bearing cap means releasably secured to the intermediate bearing bracket and adjacent the bearing means in the bearing bracket for preventing movement of the bearing means to the interior of the motor when the cap means is secured to the intermediate bearing bracket and axially moveable along the shaft in a direction away from the shaft extension a sufficient distance for permitting replacement of the bearing means segments without disassembly of rotating equipment mounted on the shaft extension when the cap means is released from the intermediate bearing bracket.

18. The combination of claim 17 wherein the annular cap means is a ring formed of a single piece.

19. The combination of claim 17 wherein the annular cap means is a ring formed of a plurality of arcuate segments.

20. The combination of claim 19 wherein the annular cap means further comprises fastening means joining the arcuate segments into a continuous seal encircling the motor shaft.

21. An improvement for use in combined motor and compressor assembly of the type having a compressor mounted on a shaft extension of the motor with a bearing bracket intermediate the motor and compressor wherein a housing surrounding the motor is secured to the compressor at a circumferential flange, the improvement comprising:
 (a) a diametrical extension of the bearing bracket of sufficient diameter such that the bearing bracket perimeter is retained between the circumferential flange and the compressor and secured by fasteners accessible without disassembly of the compressor from the shaft extension; and
 (b) an annular bearing received in the bearing bracket for supporting the shaft extension
wherein one of the bearing and the bracket has a projection and the other of the bearing and the bracket has a mating recess preventing relative rotation therebetween.

22. The improvement of claim 21 wherein the outer diameter of the bearing bracket extension is substantially equal to the diameter of the circumferential flange.

23. The improvement of claim 21 wherein the motor housing is removable from the compressor without disassembly of the compressor from the shaft extension.

24. The combination of claim 17 wherein the annular cap means is a seal.

* * * * *